(12) United States Patent
Jurkovic et al.

(10) Patent No.: US 11,382,391 B2
(45) Date of Patent: Jul. 12, 2022

(54) SHOE LAST EXTENSION AS AN ORIGIN

(71) Applicant: NIKE, Inc., Beaverton, OR (US)

(72) Inventors: Dragan Jurkovic, Taichung (TW); Ming-Feng Jean, Douliu (TW); Chin-Yi Lin, Douliu (TW); Chun-Chi Lin, Xihu (TW)

(73) Assignee: NIKE, Inc., Beaverton, OR (US)

( * ) Notice: Subject to any disclaimer, the term of this patent is extended or adjusted under 35 U.S.C. 154(b) by 1540 days.

(21) Appl. No.: 14/746,597

(22) Filed: Jun. 22, 2015

(65) Prior Publication Data

US 2016/0345683 A1 Dec. 1, 2016

Related U.S. Application Data

(60) Provisional application No. 62/168,837, filed on May 31, 2015.

(51) Int. Cl.
*A43D 3/02* (2006.01)
*A43D 119/00* (2006.01)
*G06T 7/00* (2017.01)

(52) U.S. Cl.
CPC ............ *A43D 3/022* (2013.01); *A43D 3/027* (2013.01); *A43D 119/00* (2013.01); *A43D 2200/10* (2013.01); *A43D 2200/60* (2013.01); *G06T 7/0004* (2013.01); *G06T 2207/30108* (2013.01)

(58) Field of Classification Search
CPC ..... A43D 3/027; G06T 7/0004; G06T 7/0042; G06T 2207/30108
See application file for complete search history.

(56) References Cited

U.S. PATENT DOCUMENTS

| 1,320,202 A | 10/1919 | Chapman |
| 2,111,512 A | 3/1938 | Naceski |
| 2,336,049 A * | 12/1943 | Topham ................. B27M 3/20 |
| | | 12/146 L |
| 2,409,936 A | 10/1946 | Hunt |
| 3,934,605 A | 1/1976 | Legris |
| 4,140,305 A | 2/1979 | Rabin |

(Continued)

FOREIGN PATENT DOCUMENTS

| CN | 1662159 A | 8/2005 |
| CN | 101103854 A | 1/2008 |

(Continued)

OTHER PUBLICATIONS

International Search Report and Written Opinion dated Jul. 26, 2016 for International Patent Application PCT/US2016/034151, 11 pages.

(Continued)

*Primary Examiner* — Shawn S An
(74) *Attorney, Agent, or Firm* — Shook, Hardy & Bacon, L.L.P.

(57) ABSTRACT

A method for locating critical control points on a part or combination of parts during a manufacturing process involves mating, directly or indirectly, a jig extension to the part or parts. A pattern on the jig extension defines an origin point that is used to track the position of the part or parts during manufacturing, such as during location-sensitive operations. The jig extension may be a shoe last extension which connects to a shoe or shoe component via a shoe last.

8 Claims, 10 Drawing Sheets

(56) References Cited

U.S. PATENT DOCUMENTS

| | | | |
|---|---|---|---|
| 4,286,348 | A | 9/1981 | White |
| 4,639,963 | A | 2/1987 | Fisher |
| 4,729,140 | A | 3/1988 | Emmerich |
| 4,741,062 | A * | 5/1988 | Blanc ..................... A43D 3/02 12/1 A |
| 4,928,939 | A | 5/1990 | Bell et al. |
| 7,434,284 | B2 | 10/2008 | Blanc |
| 8,849,620 | B2 | 9/2014 | Regan et al. |
| D779,571 | S | 2/2017 | Jurkovic et al. |
| 10,393,512 | B2 * | 8/2019 | Regan .................... G06T 7/521 |
| 2003/0158679 | A1 * | 8/2003 | Fukushima .......... G06T 7/0004 702/81 |
| 2005/0091765 | A1 | 5/2005 | Blanc |
| 2006/0155417 | A1 | 7/2006 | Cremaschi et al. |
| 2009/0044429 | A1 | 2/2009 | Cook et al. |
| 2013/0132038 | A1 | 5/2013 | Regan |
| 2014/0362079 | A1 | 12/2014 | Regan et al. |
| 2015/0181976 | A1 * | 7/2015 | Cooper ................ A43B 13/187 36/28 |
| 2015/0282564 | A1 | 10/2015 | Meschter et al. |
| 2017/0249783 | A1 * | 8/2017 | Mach Shepherd ..... G06T 17/00 |

FOREIGN PATENT DOCUMENTS

| | | |
|---|---|---|
| CN | 101378672 A | 3/2009 |
| CN | 202714294 U | 2/2013 |
| CN | 203234133 U | 10/2013 |
| CN | 204292340 U | 4/2015 |
| EP | 0260366 A1 | 3/1988 |
| EP | 689778 A1 | 1/1996 |
| EP | 0689778 A1 | 1/1996 |
| EP | 1354528 A1 | 10/2003 |
| EP | 1530107 A2 | 5/2005 |
| EP | 2353421 A1 | 8/2011 |
| FR | 2586909 A1 | 3/1987 |
| GB | 1494075 | 12/1977 |
| TW | 201334723 A | 9/2013 |
| WO | 2016196136 A1 | 12/2016 |

OTHER PUBLICATIONS

International Search Report and Written Opinion dated Jul. 27, 2016 for International Patent Application PCT/US2016/034136, 13 pages.
International Preliminary Report on Patentability dated Dec. 14, 2017 in International Patent Application No. PCT/US2016/034136, 9 pages.
International Preliminary Report on Patentability dated Dec. 14, 2017 in International Patent Application No. PCT/US2016/035408, 9 pages.
Final Office Action dated Jun. 20, 2017 in U.S. Appl. No. 14/746,591, 10 pages.
Non-Final Office Action dated Feb. 1, 2017 in U.S. Appl. No. 14/746,591, 8 pages.
Final Office Action dated Mar. 2, 2018 in U.S. Patent Application No. 14/746,591, 10 pages.
Non-Final Office Action dated Nov. 8, 2017 in U.S. Appl. No. 14/746,591, 8 pages.
Notice of Allowance dated Oct. 9, 2018 in U.S. Appl. No. 14/756,591, 8 pages.
Communication under Rule 71(3) dated Jan. 31, 2019 in European Patent Application No. 16729680.5, 8 pages.
Communication pursuant to Article 94(3) dated Feb. 1, 2019 in European Patent Application No. 16729682.1, 6 pages.
Notice of Allowance received for U.S. Appl. No. 16/259,699, dated Sep. 14, 2020, 11 pages.
Extended European Search Report received for European Patent Application No. 20191930.5, dated Nov. 11, 2020, 7 pages.
Office Action received for European Patent Application No. 19185967.7, dated Dec. 22, 2021, 6 pages.
Office Action received for European Patent Application No. 16729682.1, dated Oct. 19, 2020, 4 pages.
Intention to Grant received for European Patent Application No. 16729682.1, dated Nov. 9, 2021, 8 pages.
Office Action received for European Patent Application No. 16729682.1, dated Feb. 28, 2020, 6 pages.
Notice of Allowance received for U.S. Appl. No. 16/259,699, dated Nov. 20, 2020, 2 pages.
Office Action received for European Patent Application No. 16729682.1, dated Apr. 22, 2021, 4 pages.
Intention to Grant received for European Patent Application No. 16729682.1, dated Apr. 22, 2022, 7 pages.

* cited by examiner

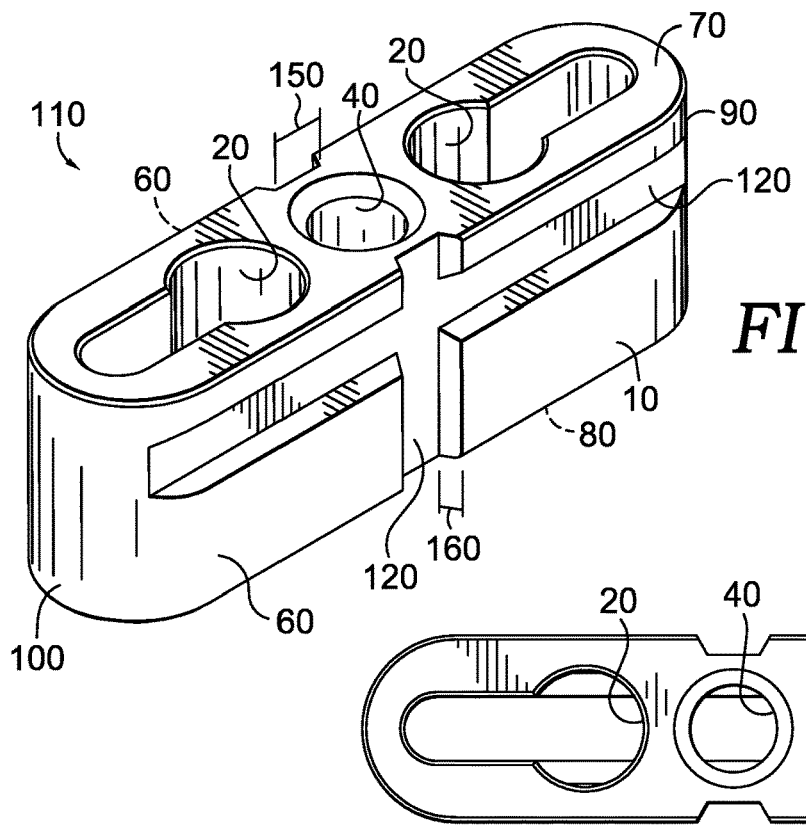
FIG. 1
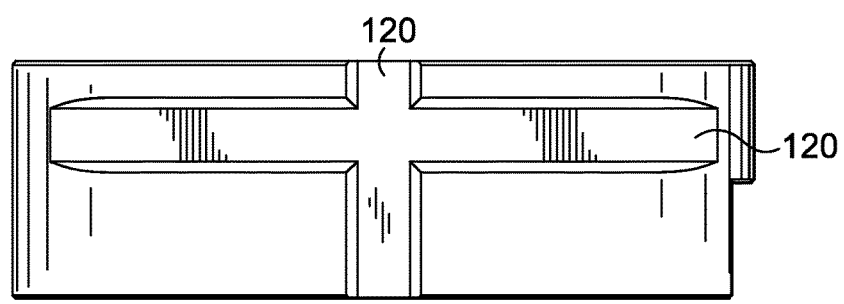
FIG. 2
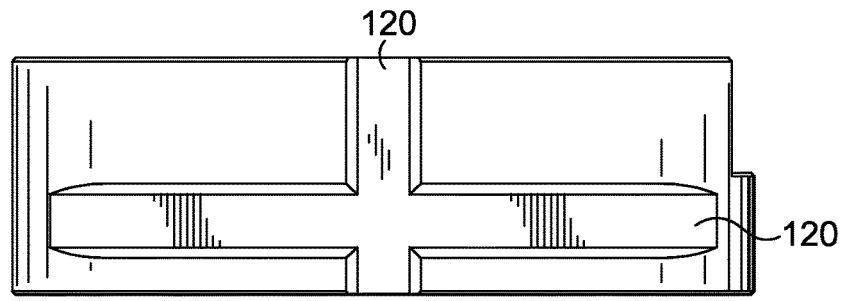
FIG. 3
FIG. 4

SHOE LAST EXTENSION AS AN ORIGIN

CROSS-REFERENCE TO RELATED APPLICATIONS

This application claims the benefit of U.S. Provisional Application No. 62/168,837, filed May 31, 2015, which is hereby incorporated by reference in its entirety. This application is related by subject matter to U.S. Provisional Application No. 62/168,836, filed May 31, 2015.

TECHNICAL FIELD

Concepts provided herein relate to an extension for a manufacturing jig, in particular, an extension for a last used in the manufacture of shoes.

BACKGROUND

The manufacturing of a shoe can be a laborious process done by human hands. Because the process has historically been performed by a person, compensations could be made during the process for variations in materials, tooling, and conditions. Therefore, less precision in the tooling, materials and/or conditions may have been enforced as it was contemplated that the human performing the process could adjust and compensate for the variations in materials, tooling, and conditions. For example, a shoe may be formed around a tooling to give it a desired shape and style. The tooling, in an exemplary aspect, is a last. The last may be handmade or it may be mass produced, but in both scenarios the last may have been formed with a limited precision as it was contemplated that the human using the last to form the shoe would provide compensation for slight variations.

BRIEF SUMMARY

This brief summary is provided as an introduction to certain features of the disclosure, and is not intended to identify key or essential components, or to be used to define the invention or any aspect of the invention in isolation from the claims and the remainder of the specification.

Aspects herein are generally directed to utilizing a last extension, which may be integral or supplemental to a last, in the manufacturing of a shoe. The last extension may be manipulated by a mechanized process, such as a robotic arm, in a manner that the mechanized process can determine a location (e.g., origin) that is common across various last extensions based on the characteristics of the last extensions. An ability to determine a common location across last extensions allows multiple mechanisms (e.g., a variety of robots) to manipulate a common last extension at different phases of manufacturing of an associated shoe. Each of the mechanisms may then know locations of the associated shoe to which a process should be performed as the location can be translated to the known last extension location, such as an origin, in an exemplary aspect. Therefore, it is contemplated that processes traditionally performed by a human that relied on compensation by the human operator can be automated with the implementation of a last extension, as will be described in greater detail hereinafter.

For example, aspects herein generally relate to an extension for a shoe last. The extension has a mounting mechanism for reversibly joining the last extension to a last in a fixed position. The last extension has a pattern on the surface of the last extension. The pattern comprises at least a line and a point off the line. The pattern serves as an origin location, allowing the manufacturing system to precisely identify the location of the last extension throughout the manufacturing process.

Points on the last, or on a shoe component or shoe on the last, that are critical during the manufacturing process can be mapped to the origin location on the last extension, allowing the manufacturing system to identify and adjust for variations in the last or components on the last. The mapping may be accomplished automatically, e.g., by scanning the last with or without key shoe components while the last is joined to the extension. To the degree the map does not change significantly, e.g., because of further manufacturing operations, such as the addition of new shoe parts that change the critical reference points on the shoe, the map can be used to account for the location and position of critical points on the shoe or shoe component without having to re-measure the last and shoe or shoe components or re-calibrate manufacturing operations.

Additional objects, advantages, and novel features of the disclosed concepts will be set forth in part in the description which follows, and in part will become apparent to those skilled in the art upon examination of the following, or may be learned by practice of the disclosure.

BRIEF DESCRIPTION OF THE DRAWINGS

The following disclosure references the attached drawing figures, wherein:

FIG. 1 is a perspective view of an exemplary last extension according to aspects hereof;

FIG. 2 is a top view of an exemplary last extension;

FIG. 3 is a side view of an exemplary last extension;

FIG. 4 is a side view of an exemplary last extension;

DETAILED DESCRIPTION

Figure 5:
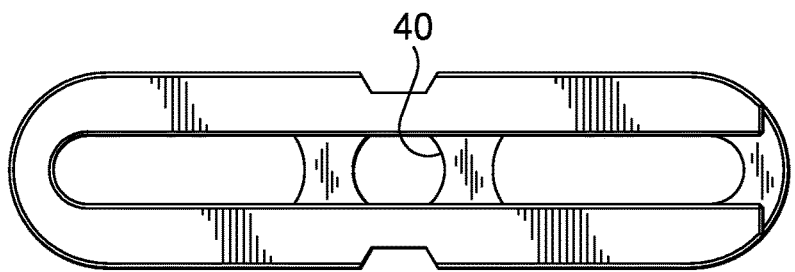
FIG. 5 is a bottom view of an exemplary last extension.
Figure 6:
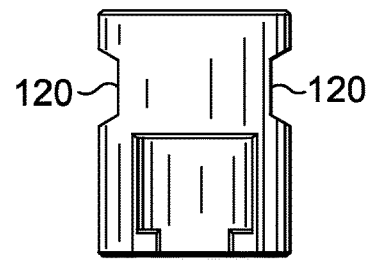
FIG. 6 is a front view of an exemplary last extension.
Figure 7:
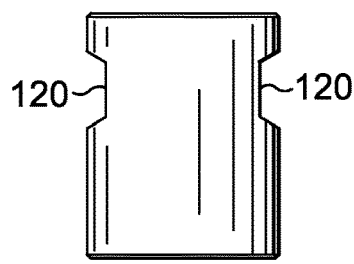
FIG. 7 is a rear view of an exemplary last extension.

The disclosed concepts are described in the context of a shoe last extension. It should be appreciated that the extension may have applicability in other manufacturing processes, where the extension might be more generally referred to as a jig extension rather than a shoe last extension. In principle, the structure and function of the jig extension would be the same as that of the shoe last extension, with variations as needed for a particular task or jig.

Aspects herein are generally directed to utilizing a last extension, which may be integral or supplemental to a last, in the manufacturing of a shoe. The last extension may be manipulated by a mechanized process, such as a robotic arm, in a manner that the mechanized process can determine a location (e.g., origin) that is common across various last extensions based on the characteristics of the last extensions. An ability to determine a common location across last extensions allows multiple mechanisms (e.g., a variety of robots) to manipulate a common last extension at different phases of manufacturing of an associated shoe. Each of the mechanisms may then know locations of the associated shoe to which a process should be performed as the location can be translated to the known last extension location, such as an origin, in an exemplary aspect. Therefore, it is contemplated that processes traditionally performed by a human that relied on compensation by the human operator can be automated with the implementation of a last extension, as will be described in greater detail hereinafter.

A shoe last is a form that is used to shape, position, and/or assemble shoe components into sub-assemblies or a complete shoe. A shoe last is typically shaped somewhat like a foot, such as a human foot, with the generalized foot shape varying based on the type and design of the shoe. For example, a shoe last for a dress pump might be notably different from a shoe last for a basketball shoe, and both might be notably different from a shoe last for a soccer shoe.

Even in the form of a generalized foot shape, e.g., not fully accounting for the curvature between the toes or conforming perfectly to a stylized foot arch, a shoe last typically has a complicated shape. This makes manufacturing multiple shoe lasts to precisely the same contours difficult and expensive. Variations in lasts for the same shoe design can interact with variation in the shoe components to create unacceptable variations in the finished shoes. Precision machined lasts have been used to reduce last-to-last variation, but precision machined lasts are expensive and may have long lead times when a new last is needed.

As such, aspects herein are generally directed to utilizing a last extension, which may be integral or supplemental to a last, in the manufacturing of a shoe. The last extension may be manipulated by a mechanized process, such as a robotic arm, in a manner that the mechanized process can determine a location (e.g., origin) that is common across various last extensions based on the characteristics of the last extensions. An ability to determine a common location across last extensions allows multiple mechanisms (e.g., a variety of robots) to manipulate a common last extension at different phases of manufacturing of an associated shoe. Each of the mechanisms may then know locations of the associated shoe to which a process should be performed as the location can be translated to the known last extension location, such as an origin, in an exemplary aspect. Therefore, it is contemplated that processes traditionally performed by a human that relied on compensation by the human operator can be automated with the implementation of a last extension, as will be described in greater detail hereinafter.

In some aspects, the disclosure relates to a last extension for a last for an article of footwear. The last comprises a body 10. Body 10 may be rigid. Suitable materials for forming a rigid body include, without limitation, steel, aluminum, copper, brass, chrome, resins, plastics, and the like. If resins or plastics are used, the specific material should be selected for dimensional stability under conditions in the manufacturing environment, such as temperature, pressure, and humidity. Body 10 may have a top or upper surface 70, a bottom or lower surface 80, a front 90 and a back 100. The body may have sides 60. As shown in FIG. 1, last extension 110 has a generally oval shape. This shape may correspond generally to the shape of a last island, be relatively easy to clean and/or be relatively easy to handle. However, the shape of the last extension is non-essential so long as it does not interfere with the assembly of the shoe. Square, circular, rectangular and complex or asymmetrical shapes could be used. Defining a "side" to an oval structure may be difficult at the periphery, however, the definition of whether a particular point on the shoulder curve between the side and back of the last extension, for example, is not critical to understanding the disclosure, as will be understood from the remainder of the description. Similarly, relative terms like upper and front are used to describe the surfaces of the body 10 for convenience, however, the last extension could be inverted, before, during, or after use, e.g., to be attached to a last or interact with other manufacturing equipment, to reorient the last during manufacturing operation(s), or to remove the extension from a last or from other manufacturing equipment.

The last extension may be made using precision machining, such as by use of a CNC milling machine. The last extension may be suitable for use with a wide variety of lasts of different sizes and designs, making it more economical to precision machine a smaller number of last extensions than a full complement of shoe lasts for a variety of shoe sizes and designs. The last extension may comprise a mounting mechanism for reversibly joining the last extension to a last. Typically, the last extension is joined to the top of the last, sometimes called the last island, so as to avoid interference with the assembly of a shoe on the last. The last may be joined to the last extension in a manner which limits rotational movement between the last and the last extension, to ensure that the position of the last relative to the last extension is fixed within acceptable tolerances. In some aspects, the last may be joined to the last extension by two or more protrusions 250, 260, as will be discussed with FIGS. 13-15 hereinafter, such as pins or bolts, which may extend through part or all of the last extension as by cavities 20 in the last extension 110. The protrusions 250, 260, if used, may be permanently or reversibly joined to a last 190, as described with reference to FIGS. 12-15 hereinafter. Alternately, the last extension may comprise permanently or reversibly attached protrusions that can be joined to corresponding cavities on the last. The last extension may comprise an additional cavity 40 or cavities along the upper 70 and/or lower 80 surfaces, or running through the last extension between the upper and lower surfaces. The additional cavity 40 or cavities, apart from any cavities that may be used to join the last extension to a last, may be useful for imprecise handling of the last extension, e.g., for storing the last extension, or for conveying the last extension, without or without the last attached, before, between, or after manufacturing operations. As an example, the additional cavity may be placed along the upper surface, and may be used to hold the last extension as it is moved from a final shoe assembly operation to a station for removing the finished shoe from the last, while the last extension is still attached to the last.

Figure 8:
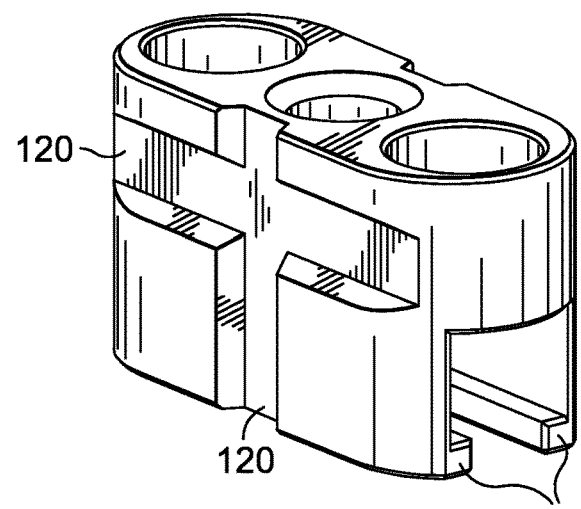
FIG. 8 is a perspective view of an exemplary last extension.
Figure 13:
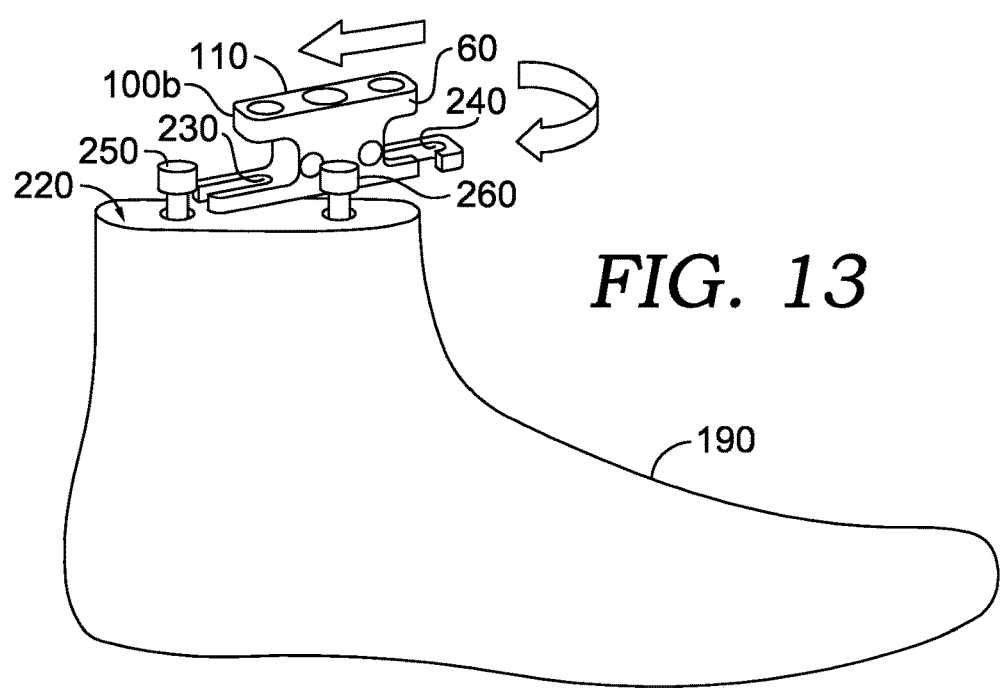
FIG. 13 is a perspective view of an exemplary last extension mounting mechanism.
Figure 15:
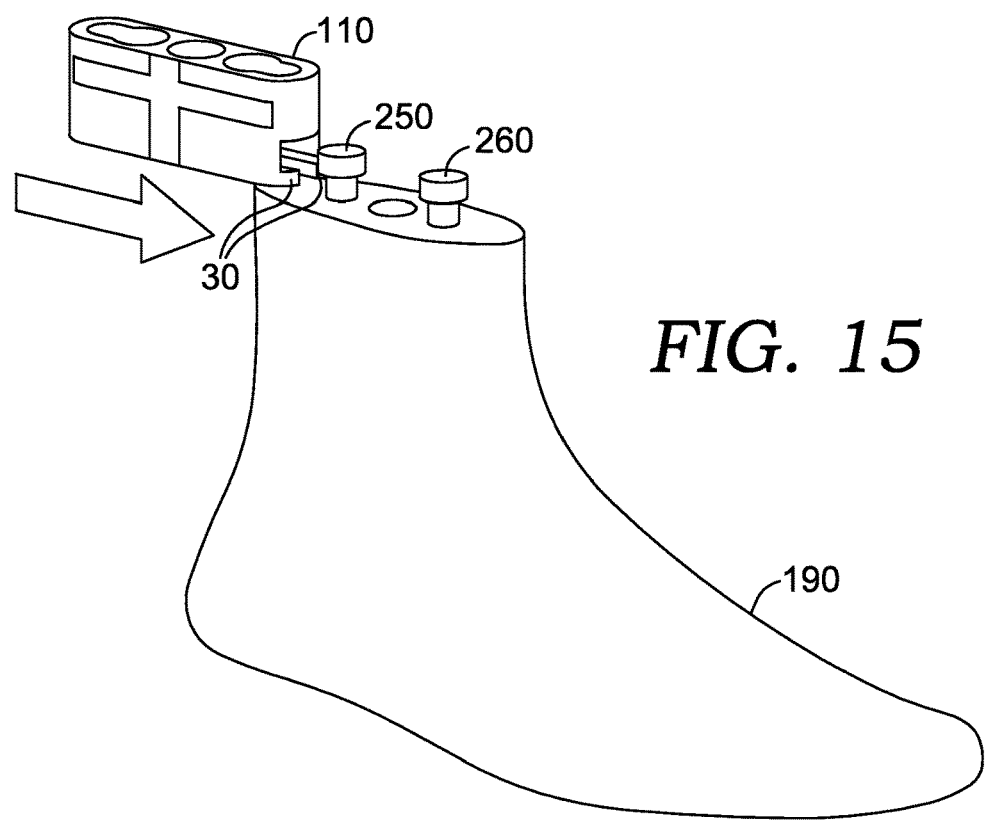
FIG. 15 is a perspective view of an exemplary last extension mounting mechanism.

A single protrusion may be used for securing the last extension to a last. To limit rotational movement around a single protrusion, the last extension may comprise tails that extend downward from the last extension beyond an upper edge of the last. Another suitable mounting mechanism has rails 30, as shown in FIGS. 8 and 15, which may slide into corresponding grooves on the last or secure a protrusion or protrusions from the last. Another useful mounting mechanism is shown in FIG. 13. In the exemplary aspect of FIG. 13, last extension 110b has a first cavity 230 opening generally toward the back 100, and a second cavity 240 opening generally toward side 60. The first cavity 230 can slide into a position substantially surrounding a first protrusion 250 from the upper surface 220 of last 190. The last extension 110b can then be rotated such that second cavity 240 substantially surrounds a second protrusion 260 from the upper surface 220 of last 190. The protrusions 250, 260 are substantially surrounded in that they are enclosed except for the open portion of cavities 230, 240 that are used to engage protrusions 250, 260.

Figure 14:
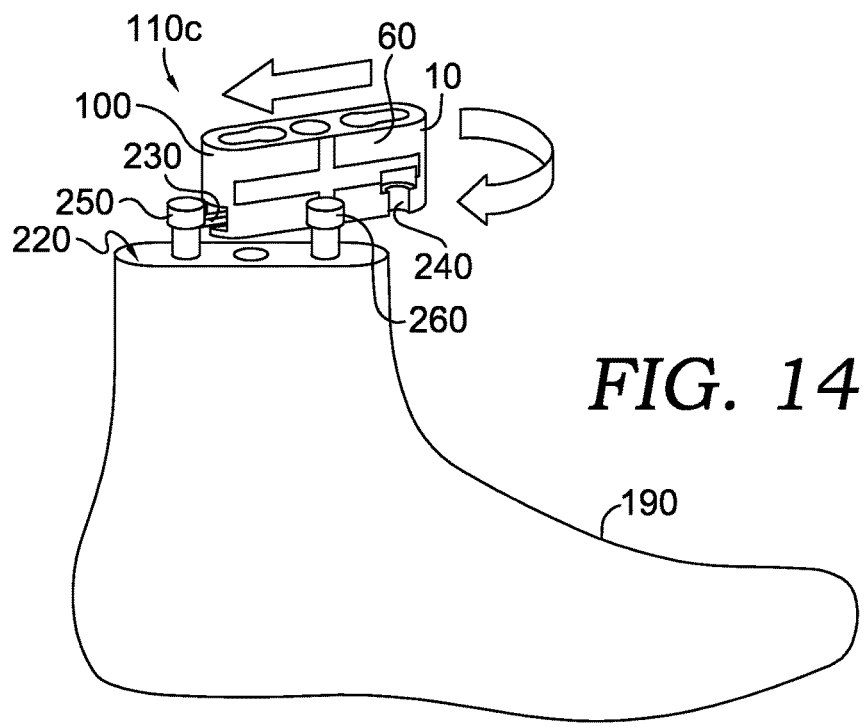
FIG. 14 is a perspective view of an exemplary last extension mounting mechanism.

The mounting mechanism shown in FIG. 14 operates similarly to that of FIG. 13, except that the cavities are incorporated into a body 10 having a more uniform cross-section perimeter than that of FIG. 13. Last extension 110c has a first cavity 230 opening generally toward the back 100, and a second cavity 240 opening generally toward side 60. The first cavity 230 can be positioned around a first protrusion 250 from the upper surface 220 of last 190. The last extension 110c can then be rotated about the first protrusion 250 such that second cavity 240 is positioned around a second protrusion 260 from the upper surface 220 of last 190. As provided above, while specific relative terms (e.g., front, back, and side) are provided, it is understood that alternatives may be implemented while accomplishing a similar result in some aspects. For example, in the above aspect, the last extension 110c could be rotated about the second protrusion 260 such that cavity 230 is positioned around the first protrusion 250, in an alternative aspect.

Figure 12:
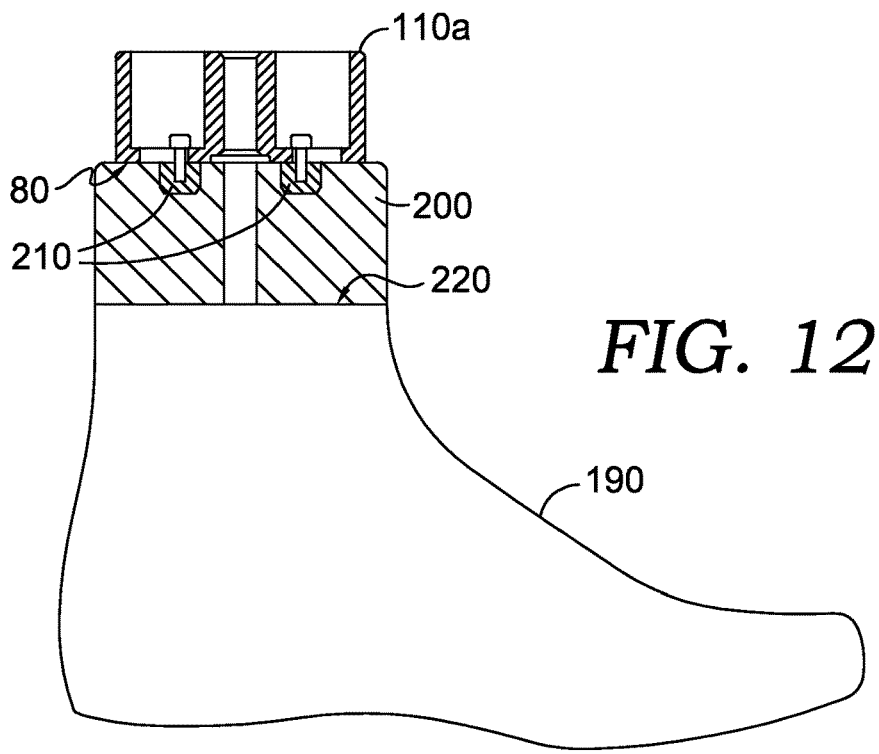
FIG. 12 is an side view of an exemplary last extension mounting mechanism.

In addition to or as an alternative to a mechanical mounting mechanism, the last extension might be magnetic or include a magnetic component. For example, as shown in FIG. 12, last extension 110a may have protrusions, such as tab-like protrusions 210, which extend beyond the lower surface 80 of the last extension 110. The last may have a protrusion, such as plane-like protrusion 200, extending from at least a portion of the upper surface 220 of the last 190. The tab-like protrusions 210 may sit on the same side of plane-like protrusion 200 (e.g., right side, left side, front, or back), or on opposite sides of plane-like protrusion 200 (e.g., right/left, front/back), or in slots or compartments within the plane-like protrusion 200. The tab-like protrusions 210 may be magnetic or may include one or more magnets or magnetic portions. The magnetism may be passive or may be activated, as by connection to a power source. Plane-like protrusion 200 may also be magnetic or may include one or more magnets or magnetic portions. Plane-like protrusion 200 or a portion thereof may have an opposite magnetic polarity to the tab-like protrusions 210. In some aspects, upper surface 220 of last 190 may be magnetic or include magnetic components, in which case plane-like protrusion 200 would not be necessary. Tab-like protrusions 210 may also be used in a non-magnetic mounting mechanism. For example, tab-like protrusions 210, when situated along or within plane-like protrusion 200 or last 190, may prevent rotational movement of last extension 110a relative to last 190.

Other mounting mechanisms are feasible for reversibly joining the last extension to a last in a manner which limits movement of the last extension relative to the last. As examples, suction may be used to join the last extension to the last, or the last extension could be bolted to the last, i.e., a bolt could be run through the last extension into the last and secured, as by hand, power tool, or robot.

Figure 9:
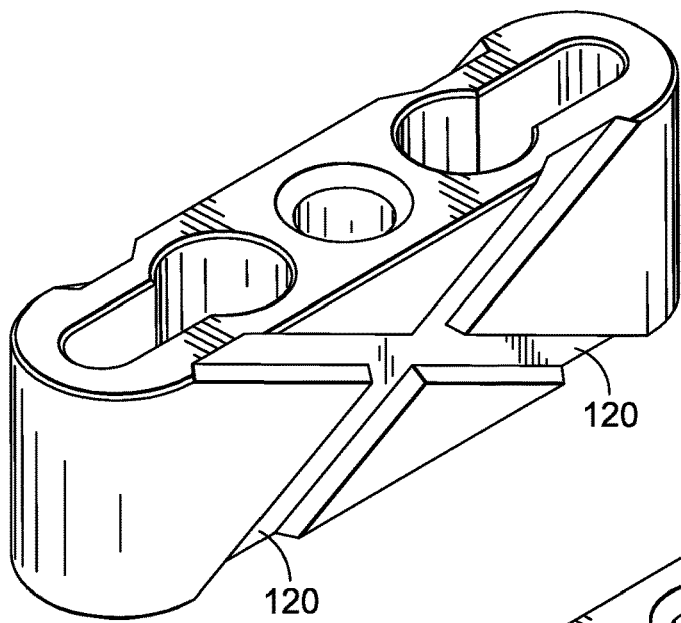
FIG. 9 is a perspective view of an exemplary last extension.
Figure 10:
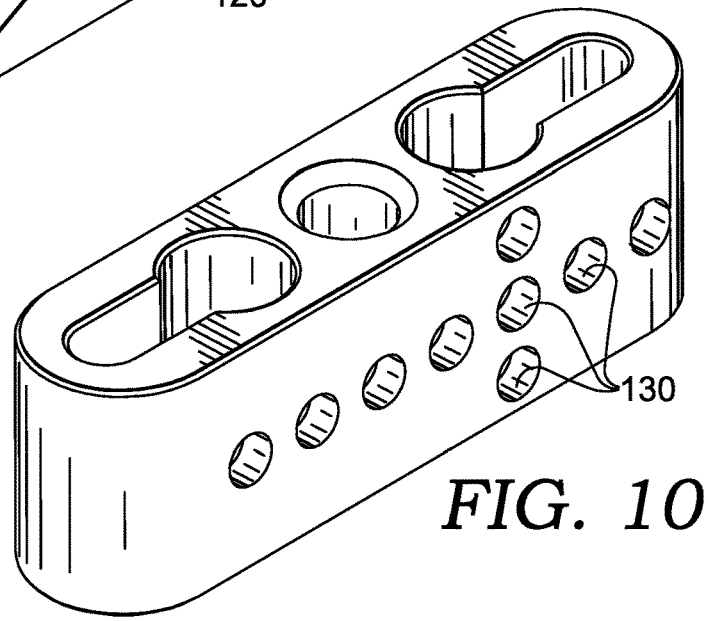
FIG. 10 is a perspective view of an exemplary last extension.
Figure 11:
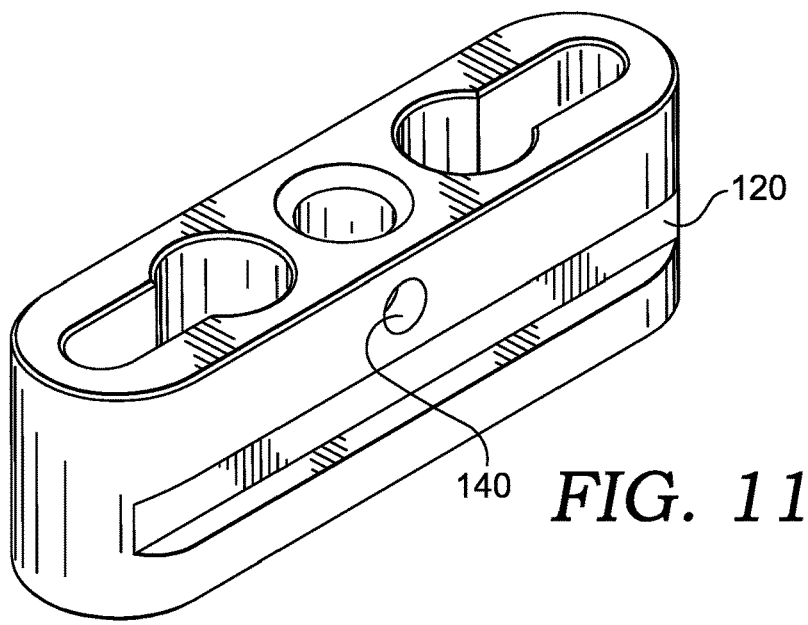
FIG. 11 is a perspective view of an exemplary last extension.

At least one side 60 of body 10 includes a pattern. The pattern may include at least a line 120 and a point off the line 140, as shown in FIG. 11, such that a relationship between the line 120 and the point off the line 140 can be used to define a single origin location on last extension 110. Typically, the origin location is defined as the point where a second line, perpendicular to line 120 and including the point off the line 140 intersects line 120, however, other relationships may be used. The pattern may have two intersecting lines 120, which may further be orthogonal to one another, as shown in FIGS. 1 and 9. A line 120 or both lines 120 and/or a point off the line 140 may be defined by discrete elements 130, such as the circles shown in FIG. 10. Other sides of body 10 may have no pattern, the same pattern, or a different pattern.

The pattern may be dimensional. As shown in FIG. 1, line 120 is not, strictly speaking, a geometric line because it has a width 150 and a depth 160. The pattern depth may be sufficient for mechanically aligning the last extension in a fixed position and known orientation. For example, a manufacturing conveyance system, such as a robotic arm, may have a gripper or clamp with a dimensional pattern complementary to that on the last extension, such that mechanically engaging the dimensional pattern on the gripper or clamp with the dimensional pattern on the last extension provides a fixed, known orientation and position for the last extension. As shown in FIG. 1, lines 120 may be grooves having width 150 and depth 160 across at least a portion of a surface of body 10.

If the pattern comprises a groove, the width of the groove may vary along its depth. As an example, if the depth of the groove extends from the surface of the body 10 inward, toward the center of the body 10, the width of the groove may be greater at the surface of the body 10 than at the deepest part of the groove. In this example, the groove might be described as V-shaped, even though the deepest part of the groove may be more of a flat or curved plateau than a point. A clamping or gripping mechanism could align itself with the pattern on the last extension and clamp down in the desired orientation, or could slide corresponding protrusions into the grooves on the surface on the last extension.

Figure 17:
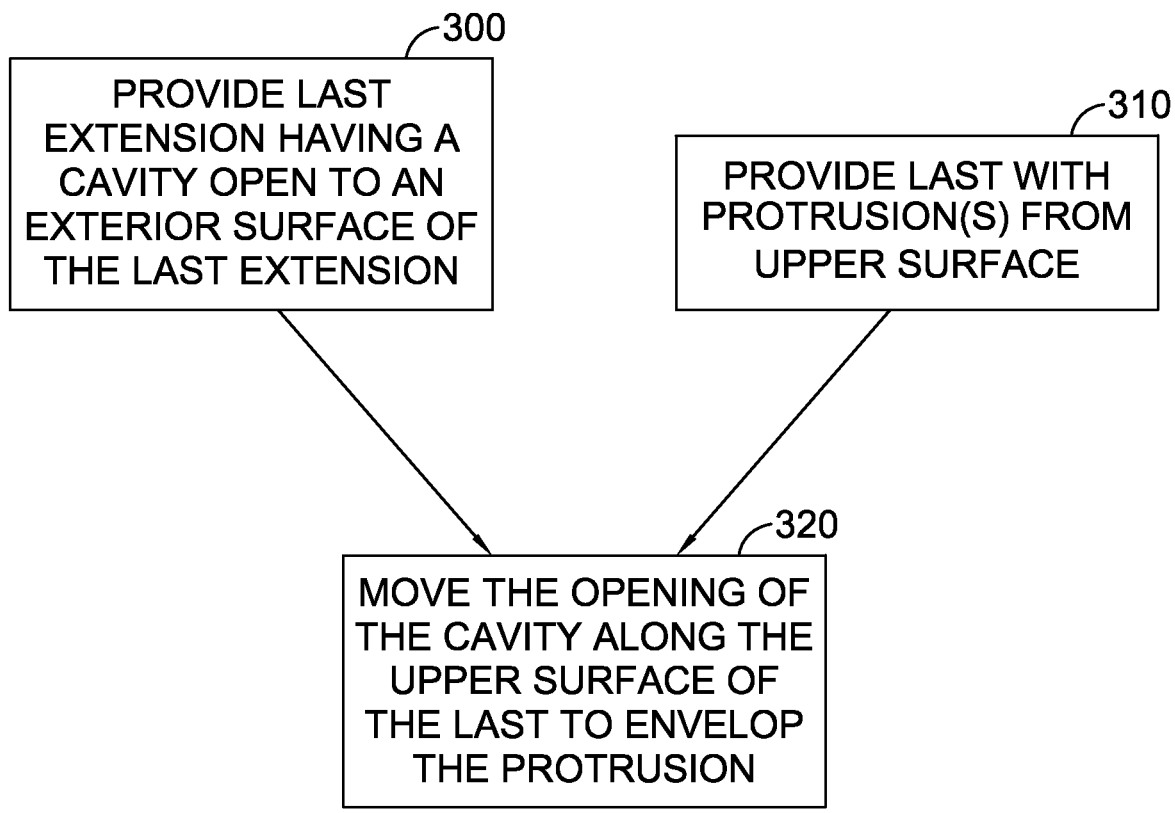
FIG. 17 is a simplified flowchart for an exemplary method for mating a last to a last extension.

In use, the last extension may be attached, manually or automatically, to a last. As shown in FIG. 17, attaching a last extension to a last may comprise providing a last extension having a cavity open to an exterior surface of the last extension at step 300. Attaching a last extension to a last may comprise providing a last with one or more protrusions from an upper surface of the last at step 310. In an exemplary aspect, the protrusions may include, but are not limited to, a bolt or screw allowing the last extension to be coupled with the last by way of a mechanical fastener. Further, it is contemplated that the protrusion may all the last to be joined to the last extension by moving the opening of the cavity in the last extension along the upper surface of the last to envelop the protrusion at least partially within the cavity in the last extension at step 320. The attachment may involve reversibly joining the last extension to a last. The attachment may involve securing the last extension in a fixed position relative to the last. There may be shoe components on the last when it is attached to the last extension, or shoe components may be placed on the last after it is attached to the last extension. It should be appreciated that these steps, like the steps in other methods and processes described herein, need not be performed strictly in the order numbered or described, unless expressly provided otherwise.

Figure 16:
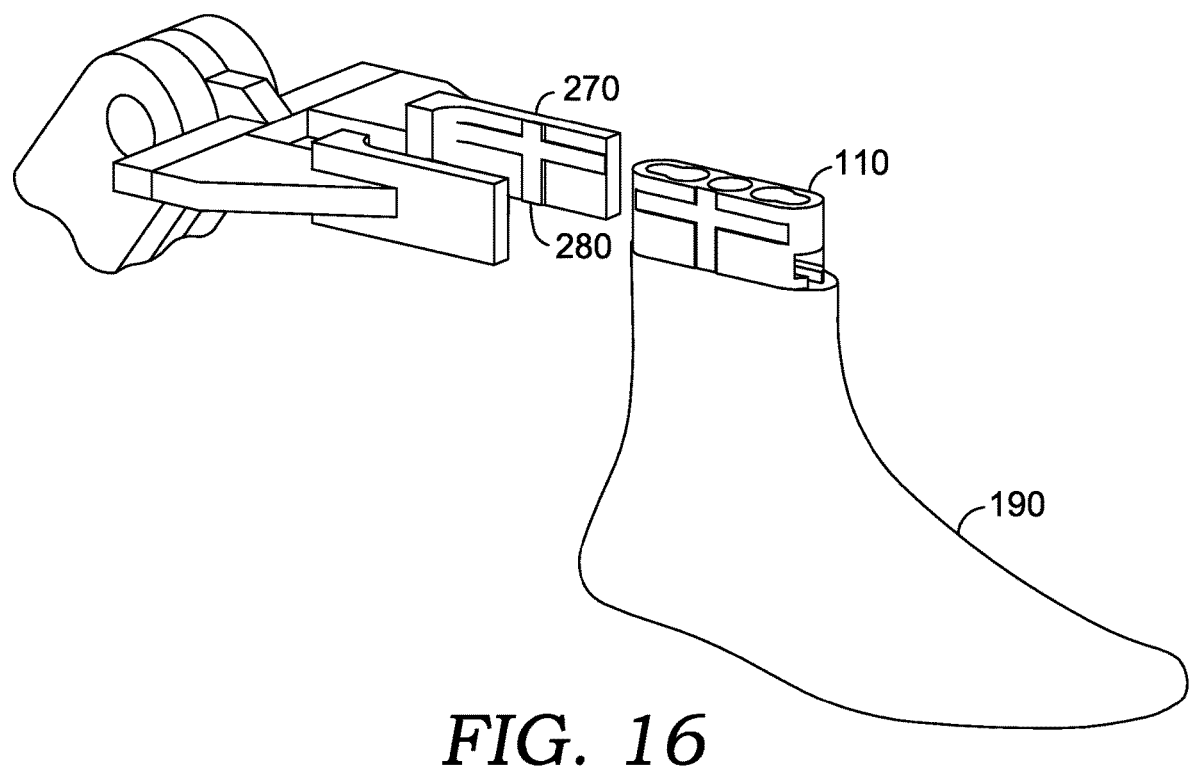
FIG. 16 is a perspective view of an exemplary last extension engaged with a last and showing an exemplary mechanism for engaging the last extension with an exemplary clamp.

The last extension may comprise a pattern that defines an origin location. The origin location may be identified by engaging a piece of manufacturing equipment having a known or determinable size and position, such as a robotic arm for conveying parts or a particular manufacturing station, such as a sewing or embroidery machine, with the pattern on the last extension. The pattern on the last extension may be dimensional to facilitate a mechanical engagement and/or to provide a mechanical confirmation that the last extension origin has been identified, e.g., because a gripper or connection is not secure until it is properly aligned with the dimensional pattern. A dimensional pattern may include a protrusion (e.g., positive space) from a surface of the last extension and/or a depression (e.g., negative space) from a surface of the last extension. An exemplary mechanical clamp 270 with a complementary pattern 280 to that on the last extension 110 is shown in FIG. 16.

The pattern on the last extension need not be dimensional, or of sufficient dimensions to facilitate mechanical identification. Other suitable means for identifying the pattern include visual detection and radio-frequency identification (RFID). Depending upon the desired identification system(s), the pattern on the last extension may be defined by RFID transmitters, by visual distinction from the body of the last extension (e.g., color or fluorescence), and/or by mechanical properties (e.g., a dimensional pattern).

Figure 18:
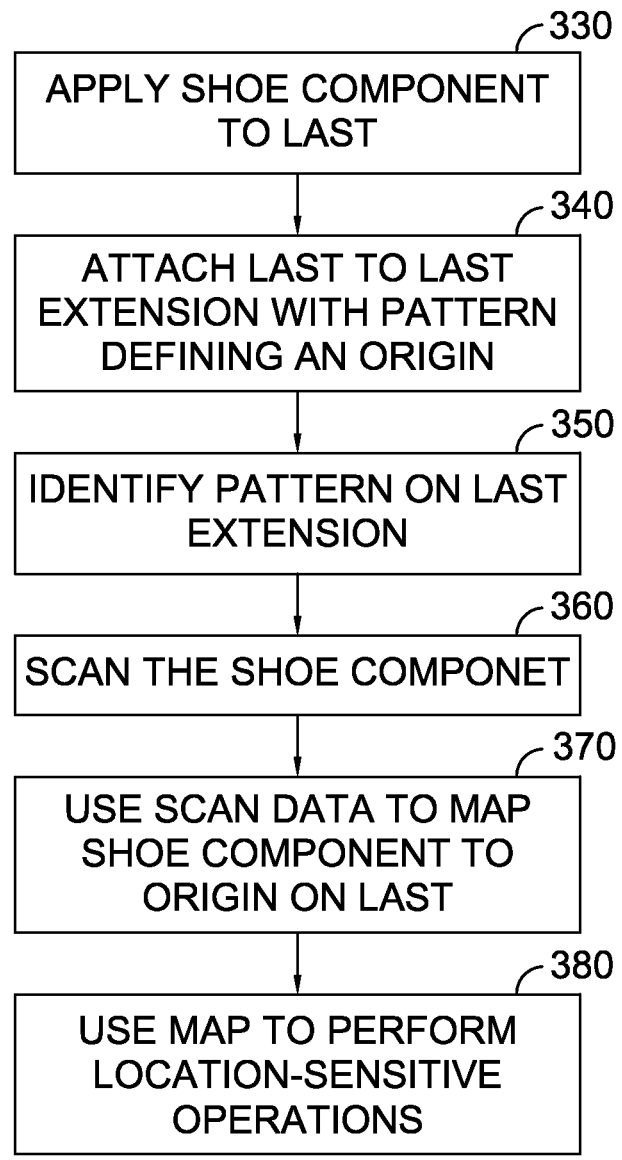
FIG. 18 is a simplified flowchart for an exemplary method for manufacturing a shoe.

As shown in FIG. 18, at step 330, before or after one or more shoe components are applied to the last in step 340 hereinafter, the last may be attached to a last extension having a pattern, the pattern useable in defining an origin location on the last extension. It is contemplated, in alternative aspects, the last extension is integral with the last and therefore the step 330 may be omitted. At a step 340, a shoe component may be applied to or placed on the last having the last extension. At step 350, the pattern on the last extension is identified. At step 360, the last and any shoe components on the last may be scanned or measured after the last is attached to the last extension. The scanning may involve acquiring a digital image and computer-analyzing the image to identify critical locations or points on the last, a shoe component(s) on the last, or an assembled shoe. The scanning may involve 2D or 3D laser scanning. Alternate scanning or imaging technology may be used. Manually, critical locations or points on the last, a shoe component(s) on the last, or an assembled shoe could be measured relative to the origin on the last extension, as with a tape measure, ruler, micrometer, or laser micrometer. At step 370, the scan data, such as critical points identified during the scan or measurement, may be mapped to the origin on the last extension. Images or scans can be used to calculate a position relative to the origin on the last extension, even if the last extension was not scanned, because the position and orientation of the last extension is known by engagement with the holder, conveyor, or other manufacturing equipment at the scanning location. This assumes that the observations of the critical points—whether by a scan, image acquisition, or direct measurement—are taken while the last is attached to the last extension. In this way, critical points, e.g., for further manufacturing operations or for quality assurance inspections, can be precisely located relative to the last extension, even if the last and/or any shoe components on the last deviate from nominal specifications. This precise location can be maintained during a manufacturing operation and between manufacturing operations, even if the last must be conveyed or transferred between different pieces of manufacturing equipment, because the critical points are always defined relative to the origin on the last extension, which can be quickly and easily located during or after transfers between systems. At step 380, the map is used to perform location-sensitive operations involving the one or more shoe components. The location-sensitive operations may be performed at one or more critical points on the one or more shoe components.

It is not necessary to obtain a complete scan or map of the entire last or all of the shoe component(s), if any, on the last, in order to provide precise location information. A scan or map does not need to yield a complete image of the last and/or shoe component(s), or even to yield an image at all. Rather, specific control points may be identified and used without generating an image of the last and/or shoe component(s). Of course, a partial or complete image may also be produced, if desired. If it is desired to render a human-readable image, the image may be generated entirely from observations or measurements of a specific part, or non-critical portions of the image may be assumed or inferred based on observations or measurements of critical points and/or general information about the shoe design.

Critical points may include, for example, locations on the shoe or shoe component where a location-sensitive manufacturing operation occurs. An operation is location-sensitive if a deviation in the location at which the operation is performed results in an unacceptable functional or aesthetic defect when the magnitude of the deviation in placement is small relative to typical process and/or part variations. A critical point may be a path along which decorative or functional stitching should be placed. Another critical point may be a region of a shoe to which an adhesive, dye, or other decorative or functional substance should be applied. Another critical point may be the region at the bottom edge of a shoe upper to which cement is applied to attach a sole. Many other critical points are possible, and critical points may vary based on the design of the shoe and/or the state of a particular shoe's manufacture (e.g., how many manufacturing steps have been completed).

If a critical point changes during the manufacturing process, as, for example, because of the addition of new components or the re-shaping of prior components, the new critical points can be scanned and manufacturing can continue without additional measurement or observation, using the last extension origin for manufacturing control, unless and until there is a future change in one or more critical points on the shoe or shoe components. If there is a change in one or more critical points, new observations or measurements can be taken. It is possible, but not uniformly necessary, to create a complete scan or map of the changed critical point(s). Images and/or data can be collected only from portions of the shoe components which have changed. In some cases, the transformation in the shoe components may be so significant that a complete scan, or a scan of more than the critical points that have changed, or a scan of all critical points, may be desirable.

The map of the critical points relative to the origin defined by the pattern on the last can then be used to position location-sensitive operations as the last having a last extension transfers between different mechanisms and processes. For example, adhesive, such as cement that might be used to join a shoe upper to a shoe sole, can be placed precisely, accounting for process variations including variations in the shape and size of the last and/or variations in the shape, size, or position of any shoe components on the last. This precise placement can be done almost instantly, without need to verify the position of the last or the shoe components, which are known from the position of the last extension and the map of critical points on the last or the shoe components relative to the pattern defining an origin location on the last extension. Other operations, including operations which might not be location sensitive, such as some buffing or cleaning operations, can also be performed.

Once the critical points are mapped to the origin on the last extension, a series of operations can be performed. For example, the last extension may be joined to the last. The last extension, joined to the last, may be conveyed to a manufacturing station. A first manufacturing station may be a scanning station. The conveyance system may engage with the last extension in a way that identifies the origin on the last extension, or the conveyance system may permit or facilitate the transfer of the last extension to a gripper that can identify the origin on the last extension. A scan may be taken of the last and any shoe components on the last while the position and orientation of the pattern on the last extension are known. Critical points on the last and/or any shoe components on the last may be mapped to the origin location on the last extension. At the same or a separate station, a manufacturing operation may be performed at one or more of the critical points on the last and/or any of the shoe components. Exemplary manufacturing operations include moving or repositioning a particular component of the shoe; applying a substance, such as a dye or an adhesive, to a portion of one or more shoe components; joining two or more shoe components; inspecting the shoe, as by automated inspection; and the like. Knowing the precise location of the last and/or any shoe components on the last indirectly by identifying the pattern on the last extension may permit for more precise positioning of location-sensitive manufacturing operations, permit the automation of manufacturing operations that are often completed by hand, reduce the frequency and/or severity of functional and/or aesthetic defects, and do so without the cost or time required to use precision machined lasts or to re-establish the position of the last and/or any shoe components on the last at multiple manufacturing stations.

After a particular manufacturing operation or after completion of a particular shoe, the last extension may be removed from the last. The last extension may be re-used with another last of the same type, or with another last of a different design and/or size, so long as the last is compatible or can be retrofitted to be compatible with the mounting mechanism on the last extension. Similarly, the last extension may be used with different manufacturing equipment, such as conveyance systems or operation stations (such as stitching or embroidery machines, gluing stations, part addition and/or joining stations, inspection stations, cleaning stations, etc.). As a result, a single precision-machined last extension may be used much more often than a particular last, resulting in a cost-savings relative to precision machining lasts for shoes of different sizes and designs.

It should be appreciated that the last extension could also be integral to or permanently joined to a last, or could be reversibly attached but not removed from the last after a particular process or after the manufacture of a single shoe. For example, a finished shoe or shoe component may be removed from the last and the last may be redeployed to manufacture another shoe or shoe component without removing the last extension.

Figure 19:
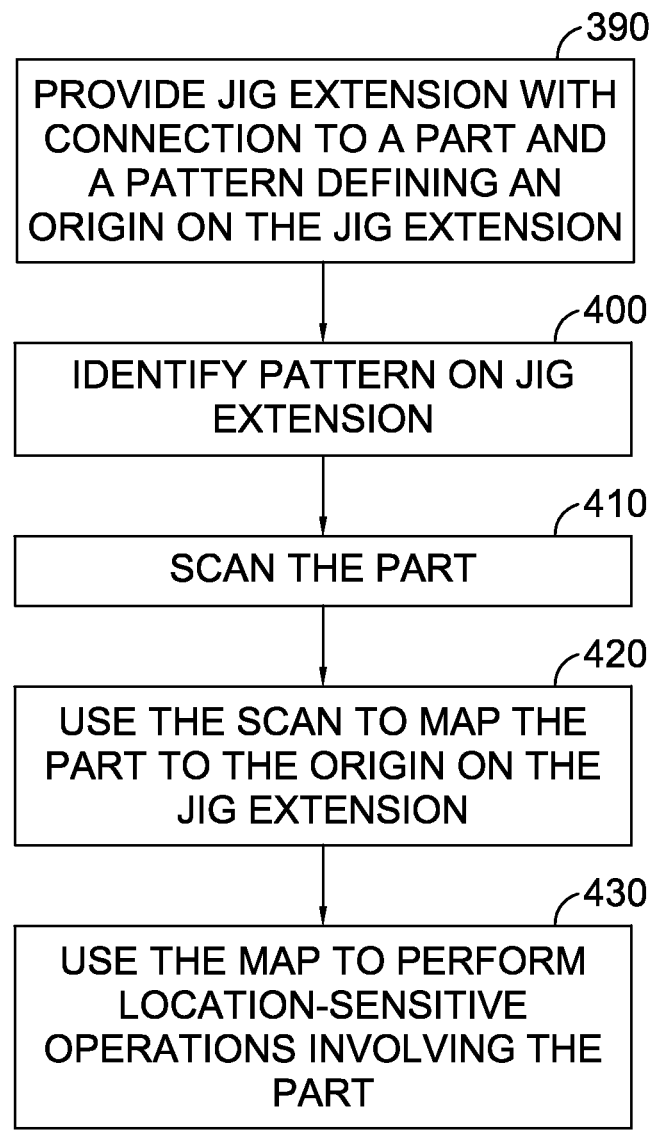
FIG. 19 is a simplified flowchart for an exemplary method for determining the position of variable parts.

A method for using a jig extension, rather than a shoe last extension, is shown in FIG. 19. As mentioned above, the concept of a jig extension is comparable to that of a shoe last extension, except that the jig which is being extended is not necessarily a shoe last. In some embodiments, a jig extension may engage directly with a part rather than with another jig. At step 390, a jig extension is provided, the jig extension having a connection to a part (direct or indirect, as through a jig which connects to a part) and a pattern defining an origin location on the jig extension. At step 400, a pattern on the jig extension is identified. At step 410, the part connected to the jig extension is scanned. At step 420, the scan is used to map at least a portion of the part, such as critical points on the part, to the origin on the jig extension. At step 430, the map is used to perform location-sensitive operations involving the part. The location-sensitive operations may be performed at, along, or near critical points on the part.

The origin pattern on the last extension or jig extension may be useful for identifying the position and/or orientation of the extension during manufacturing, such as when the extension is transferred between locations or separate manufacturing machinery, however, for the purpose of process control, any point on or within the last extension could be used as an alternate origin, calculated in relation to the initial calibration pattern and/or the pattern on the last extension. Such an alternate origin point, because it is defined in relation to the origin pattern, does not need to be marked or distinguishable on the extension. The alternate origin point may not be discernible from the physical last. If an alternate origin point is used, the "origin" pattern on the last extension may still function to track the position and orientation of the last extension, e.g., by providing a mechanical, visual, RFID, or other signal of the position and orientation of the last extension during in-process transfers of the last extension. An alternate origin point may be useful, for example, to simplify calculations used in process control. Critical control points may be identified relative to the pattern on the last, to an alternate origin point, or both. Different alternate origin points may be used for different shoe designs and/or for different processes. That is, an alternate origin point, if used, may change during the processing of a particular shoe, or for the processing of different shoes, or both.

As multiple systems based on different technologies may be utilized in the manufacturing of an article, it is contemplated that a unifying calibration may be performed to allow the various systems and technologies to achieve a common understanding of where an origin, such as on a last extension, may be positioned in space. For example, it is contemplated that a vision system may be implemented to identify one or more critical points on a shoe, such as a bite line between the shoe upper and the sole to be affixed thereon. As provided herein above, a vision system may determine the critical points and then generate a mapping of the critical points back to an associated origin, such as an origin of the last extension. However, in an exemplary aspect, the creation of the mapping between visually determined critical points on the shoe and an origin of the last extension may benefit from a calibration process that ensures the vision system is able to locate the last extension origin.

Figure 20:
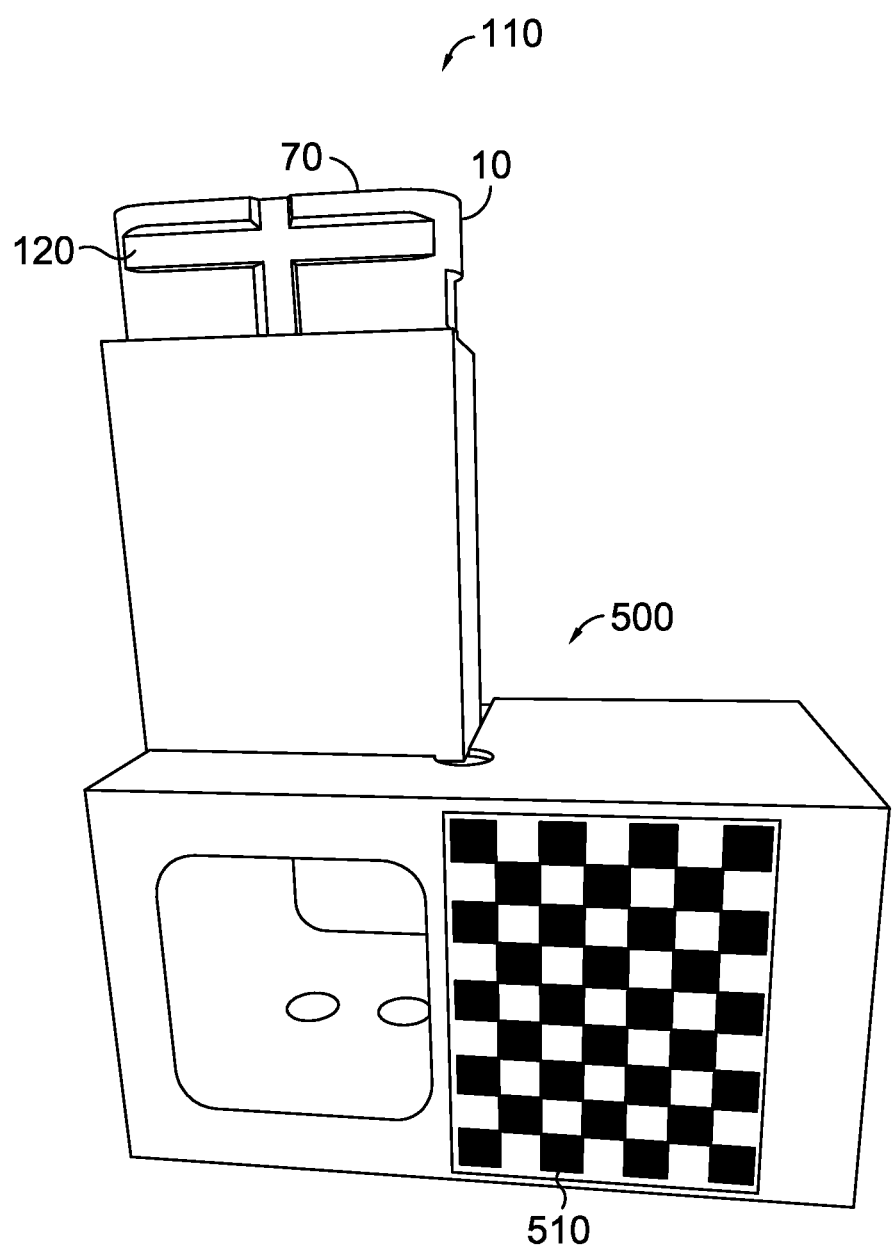
FIG. 20 is an exemplary calibration tool.

The position of the last extension origin may be visually calibrated before the last extension is used in manufacturing. Checkerboard calibration is one suitable process known in the art, by which a vision or laser scanning system can detect a precise position in a standard pattern. As shown in FIG. 20, a last extension 110 may be placed on a calibration block 500. The calibration block may comprise a checkerboard pattern 510 or other suitable calibration pattern. The checkerboard pattern may be situated in a known position on a precisely machined calibration block. The calibration block may precisely secure the bottom of the last extension, such that identification of one or more control points on the calibration block translates to identification of the location of the precisely machined last extension 110. The calibration block may define an x-y-z axis that may also be used as a reference point in calibration and/or process control.

Further, it is contemplated that an additional system, such as a robot controlled process (e.g., adhesive applicator controlled by a CNC robot, a cutting mechanisms controlled by a CNC robot, a painting mechanism controlled by a CNC robot, sewing mechanism controlled by a CNC robot) may be performed on the shoe associated with the last extension. In order for the robotic elements to determine a position of the last extension origin, a calibration process may be performed utilizing the calibration block 500. For example, prior to the processing of a shoe component by the robotically-controlled mechanism (e.g., adhesive applicator, printing mechanism, cutting tool), the robot may be calibrated in relation to the last extension.

The process of calibrating the robot may include touching a series of known locations on the calibration block 500. For example, points 502, 504, and 506 are fixed locations defined by the intersection of multiple surfaces on the calibration block 500. It is contemplated that any calibration process known in the art may be implemented and any collection and number of points may be used in exemplary aspects. However, following the above example using the points 502, 504, and 506, because the calibration block 500 is precision formed and the location of a last extension is known when associated (e.g., removably secured) with the calibration block 500, calibrating the robot to the calibration block 500 through touching the sequence of points allows the robot to determine a position of the last extension in dimensional space. Further, since the last extension origin is known relative to the last extension as a whole, a translation may be calculated to determine the position of the last extension origin from the known location of the last extension. Additionally or alternatively, it is contemplated that at least one of the touch points used in the calibration process with the calibration block 500 includes a point on the last extension, such as at an intersection of dimensional elements.

The multi-step calibration process for multiple systems (e.g., vision and mechanical) allows, in exemplary aspects, for a translation of positional data to be performed. For example, once one or more critical points are determined on a shoe by a vision system and then mapped to the last extension origin, a secondary system using a mechanical engagement of the last extension can determine where the critical points are relative to the last extension origin to which the secondary system has also been calibration. For example, a vision system may determine a biteline location on a shoe upper as the shoe upper is maintained on a last having a last extension. The biteline is then mapped or translated to the last extension origin, such as by a computing system as is known in the art. The last having the shoe is then transferred to an adhesive applicator that manipulates the shoe on the last by mechanically engaging the last extension. Because the adhesive applicator was previously calibrated to the last extension, the adhesive applicator is aware of the location of the last extension origin relative to the adhesive applicator. Therefore, it is contemplated that the mapping of the biteline to the last extension may be utilized by the adhesive application to determine the location of the biteline relative to the known last extension origin, in this exemplary aspect. As a result of coordinating the location of the biteline relative to the last extension at the adhesive applicator, adhesive may be applied to the shoe in accordance with biteline of the shoe, in an exemplary aspect.

Once calibrated, a manufacturing system may not need to be "homed" or "re-zeroed" in the absence of a significant disruption in the position of one or more pieces of manufacturing equipment, e.g., after significant maintenance activity or an earthquake. Calibration may be performed on an as-needed basis, e.g., when the position of the equipment has been disrupted, or when changes in routine process variation suggest that recalibration might be helpful, or calibration may be performed periodically, e.g., to prevent the accumulation of small errors over time, even in the absence of a significant event. In particular, it may not be necessary to recalibrate the process for different extensions of the same kind, or even for lasts of different kinds that bear the same spatial relationship between the pattern on the extension and one or more control points associated with the calibration block.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A method for precisely determining the position of variable parts, the method comprising:
   providing a jig extension, the jig extension comprising a connection to a part and a pattern defining an origin on the jig extension;
   identifying the pattern on the jig extension;
   scanning the part to yield scan data for at least a portion of the part;
   with the scan data, mapping at least a portion of the part to the origin on the jig extension; and
   using the map to perform location-sensitive operations involving at least a portion of the part.

2. The method of claim 1, wherein the pattern comprises two intersecting lines.

3. The method of claim 2, wherein the two lines are orthogonal to one another.

4. The method of claim 3, wherein the lines are continuous grooves across at least a portion of a surface of the jig extension.

5. The method of claim 3, wherein the lines are formed of discrete pattern components.

6. The last extension of claim 5, wherein the discrete pattern components are arcuate.

7. The method of claim 1, wherein the jig extension is reversibly attached to the part.

8. The method of claim 7, wherein the jig extension is indirectly attached to the part.

* * * * *

UNITED STATES PATENT AND TRADEMARK OFFICE
CERTIFICATE OF CORRECTION

PATENT NO. : 11,382,391 B2  
APPLICATION NO. : 14/746597  
DATED : July 12, 2022  
INVENTOR(S) : Dragan Jurkovic et al.

Page 1 of 1

It is certified that error appears in the above-identified patent and that said Letters Patent is hereby corrected as shown below:

In the Claims

Claim 6, Column 12, Line 58:
The line reading "The last extension of claim 5, wherein the discrete" should read --The method of claim 5, wherein the discrete--.

Signed and Sealed this
Eighth Day of November, 2022

Katherine Kelly Vidal
*Director of the United States Patent and Trademark Office*